(12) United States Patent
Schellhorn

(10) Patent No.: US 7,377,726 B2
(45) Date of Patent: May 27, 2008

(54) METHOD AND APPARATUS FOR BUILDING REINFORCED SEA WALLS AND LEVEES

(75) Inventor: Verne L. Schellhorn, Gualala, CA (US)

(73) Assignee: Aerial Industrial, Inc., Gualala, CA (US)

( * ) Notice: Subject to any disclaimer, the term of this patent is extended or adjusted under 35 U.S.C. 154(b) by 0 days.

(21) Appl. No.: 11/712,016

(22) Filed: Feb. 28, 2007

(65) Prior Publication Data

US 2007/0212173 A1    Sep. 13, 2007

Related U.S. Application Data

(60) Provisional application No. 60/783,570, filed on Mar. 17, 2006, provisional application No. 60/779,798, filed on Mar. 7, 2006.

(51) Int. Cl.
*E02B 3/06* (2006.01)
(52) U.S. Cl. .................. 405/284; 405/287; 405/31; 405/35
(58) Field of Classification Search ........ 405/284–286, 405/262, 31, 34, 35
See application file for complete search history.

(56) References Cited

U.S. PATENT DOCUMENTS

| | | | | | |
|---|---|---|---|---|---|
| 20,105 | A | * | 4/1858 | Tracy | 405/35 |
| 315,384 | A | * | 4/1885 | Boynton | 405/34 |
| 1,895,985 | A | * | 1/1933 | Goldsborough | 405/285 |
| 3,381,483 | A | * | 5/1968 | Huthsing, Jr. | 405/262 |
| 3,728,862 | A | * | 4/1973 | Meredith | 405/285 |
| 3,969,902 | A | * | 7/1976 | Ichise et al. | 405/267 |
| 4,440,527 | A | * | 4/1984 | Vidal | 405/284 |
| 4,572,711 | A | * | 2/1986 | Benson et al. | 405/286 |
| 4,728,225 | A | * | 3/1988 | Brandl et al. | 405/262 |
| 5,158,399 | A | * | 10/1992 | Flores | 405/285 |
| 6,371,699 | B1 | * | 4/2002 | Weinreb | 405/262 |

FOREIGN PATENT DOCUMENTS

JP    56077413 A  *  6/1981
JP    04357210 A  * 12/1992

* cited by examiner

*Primary Examiner*—Frederick L Lagman
(74) *Attorney, Agent, or Firm*—Bruce H. Johnsonbaugh

(57) ABSTRACT

A method and apparatus are disclosed for building a reinforced sea wall or levee. The reinforced structure is designed particularly for use in areas of soft sub-soil such as those sub-soils found near the Gulf of Mexico which are capable of bearing loads of less than 5 pounds per square inch of weight. The structure includes first and second rows of soil-cement columns formed on opposite sides of the centerline of the structure. Soil-cement columns are formed by mechanically cutting the soft sub-soil and simultaneously hydraulically mixing the cut soft soil with a cement slurry injected at velocities of 200 feet per second or more. Reinforcing structural elements, preferably H-beams, are embedded in at least some of the soil-cement columns in each of the two rows. Tensile load bearing members, such as cables or beams, are interconnected between some of the reinforcing structural elements in the first row of soil-cement columns with some of the structural elements in the second row of soil-cement columns. Lagging walls are installed between upstanding H-beams. Fill materials, such as sand, silt or sediment, are then deposited between the two rows of soil-cement columns. Optionally, a third row of soil-cement columns is placed between the first and second rows and longitudinal beams are placed at ground level, extending between the outer rows of soil-cement columns and being placed on top of the center row of columns. An optional semi-permeable mat is placed on top of these beams to bear the weight of the sandy fill material and to transfer that weight to the three rows of soil-cement columns.

10 Claims, 5 Drawing Sheets

METHOD AND APPARATUS FOR BUILDING REINFORCED SEA WALLS AND LEVEES

CROSS-REFERENCE TO RELATED APPLICATIONS

This application claims the benefit of and priority from U.S. provisional application 60/779,798 filed on Mar. 7, 2006 and 60/783,570 filed on Mar. 17, 2006.

BACKGROUND AND BRIEF SUMMARY OF INVENTION

The present invention pertains in part to the building of sea walls and/or levees on soft subsoil, such as found in New Orleans and the Gulf Coast. The need for sturdy sea walls and/or levees to protect oil and gas infrastructure, as well as cities, is overwhelming, and becomes more dire with the passage of time. The need is expressed regularly since hurricane Katrina occurred in August, 2005.

One of the most difficult aspects of building sea walls and/or levees near the Gulf Coast is that the local subsoil that is readily available is soft and/or sandy, and therefore not desirable for use. The prior art has simply not found a way to use such subsoil as the primary component of structurally sound, long lasting sea walls or levees. Prior art sea walls typically depend on fairly solid and dense soil or rock in which to place anchors on the inland side of the sea wall (see U.S. Pat. Nos. 4,674,921; 4,480,945 and 6,908,258). Prior art levees typically depend on importing solid, dense soil.

The present invention overcomes the above problem and for the first time provides a robust, long lasting sea wall and/or levee using the abundant, readily available, soft, sandy subsoil typically found near the Gulf Coast as the primary building material!!

A further advantage of the invention is that soft, sandy subsoil from water bodies adjacent the sea wall or levee may be dredged to deepen the water body for navigation, and simply placed on top of the sea wall or levee. Such soft, sandy materials heretofore have been hauled great distances from where they are dredged for disposal.

The present invention provides a method of building new, reinforced sea walls and/or levees to protect cities as well as oil and gas infrastructure such as refineries, pipelines and related facilities from storm surges.

The present invention is based in part on the proven technology known as GEO-JET® and as described in U.S. Pat. Nos. 4,793,740; 4,958,962; 5,396,964; 5,890,844; 6,183,166; 6,241,426 and 6,988,856, all of which are hereby incorporated by reference.

A primary object of the invention is to provide a robust and long lasting sea wall and/or levee design that utilizes the soft, sandy subsoil such as typically found near the Gulf of Mexico as its primary building material.

A further advantage of the invention is that soft, sandy subsoil from water bodies adjacent the sea wall or levee may be dredged to deepen the water body from navigation and placed on top of the sea wall or levee.

A further object of the invention is to provide a sea wall and/or levee design for use in Gulf Coast areas wherein the existing soft, sandy materials do not have to be removed and hauled great distances for disposal.

A further object of the invention is to provide a novel sea wall and/or levee for providing efficient protection for oil and gas infrastructures such as refineries, pipelines and related facilities from storm surges.

Further objects and advantages will become apparent from the following description and drawings wherein:

DETAILED DESCRIPTION OF THE DRAWINGS

Figure 1:
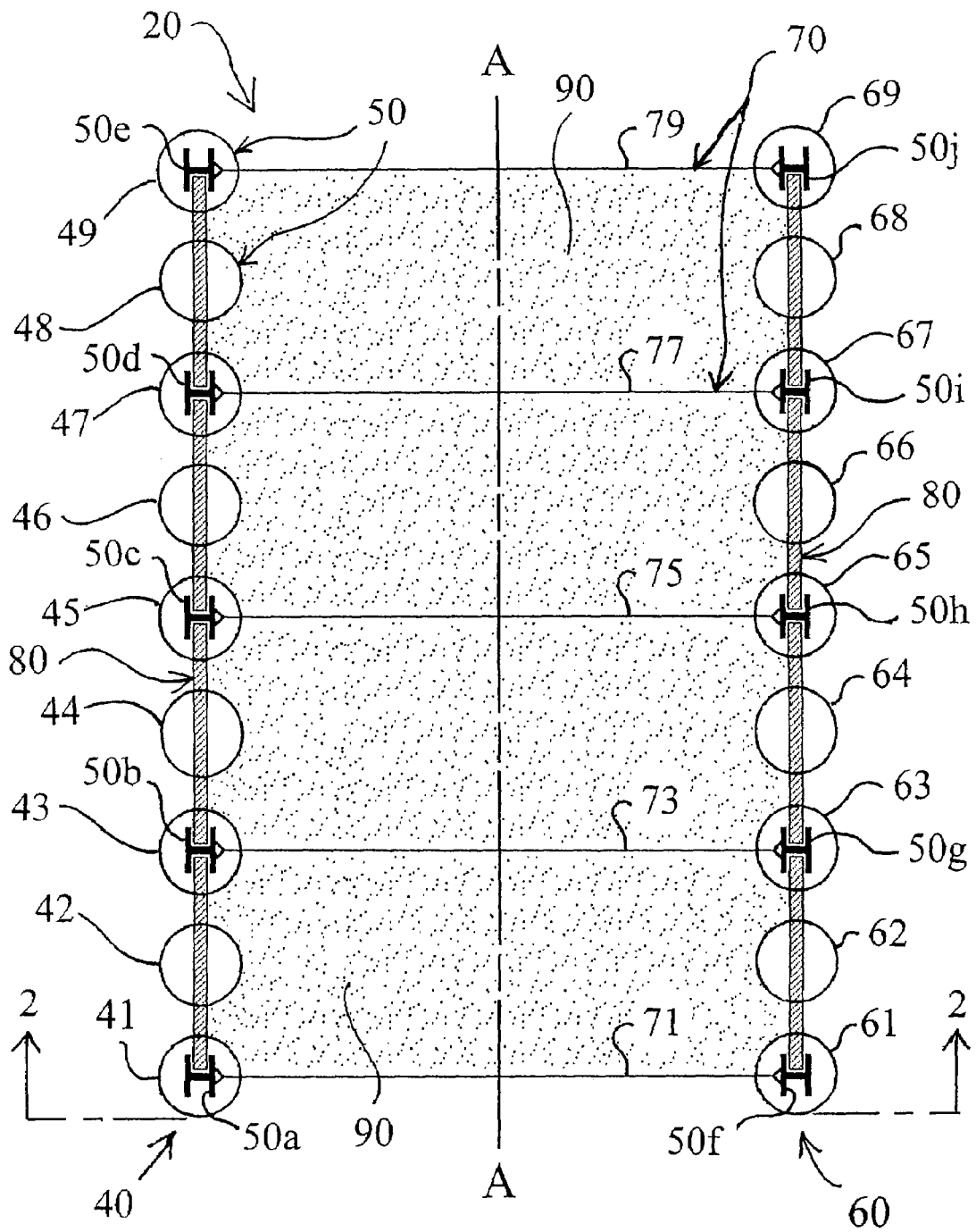
FIG. 1 is a plan view of a first embodiment of the novel sea wall or levee.
Figure 2:
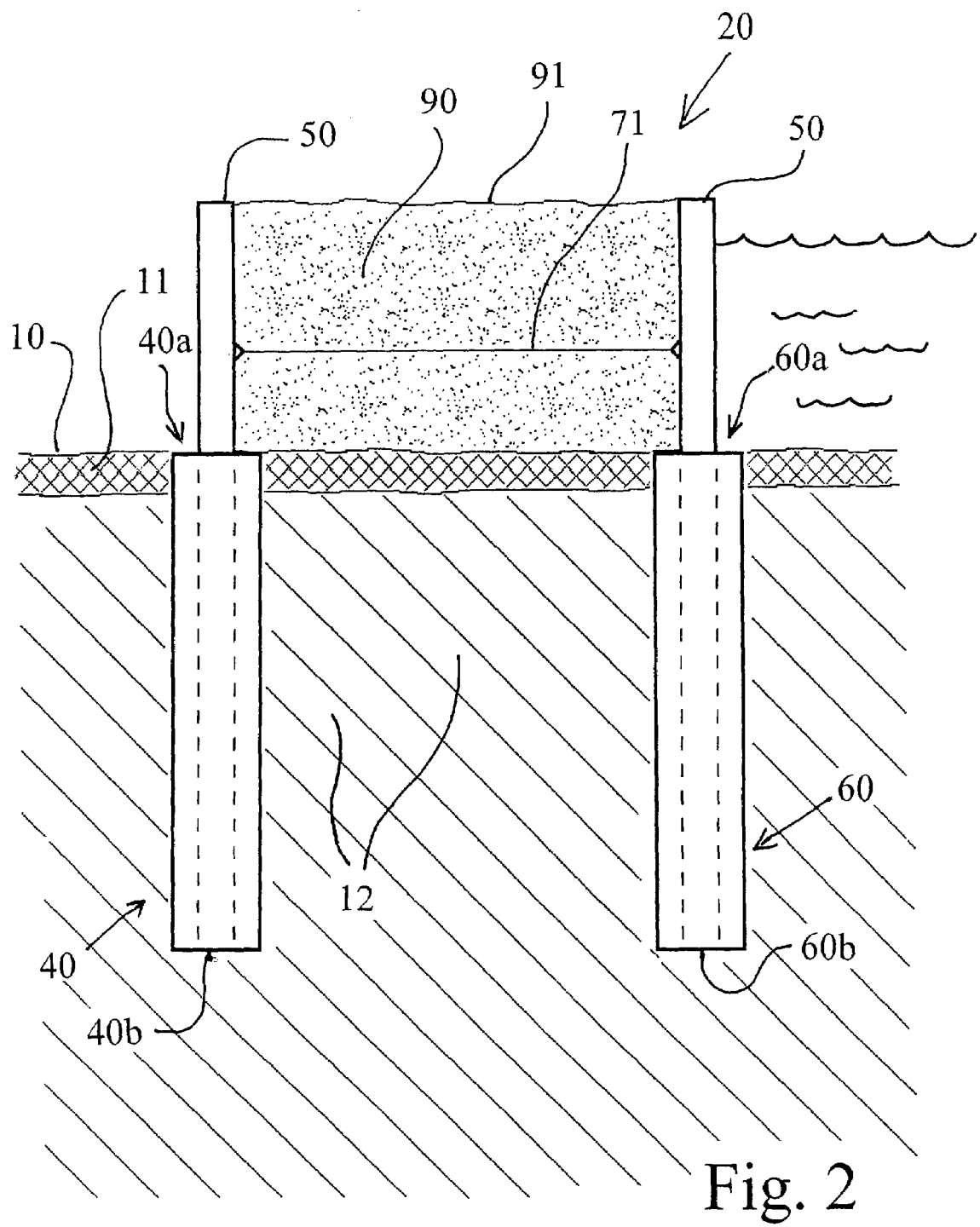
FIG. 2 is a section on the line 2-2 of FIG. 1.

FIGS. 1 and 2 illustrate one embodiment of the novel sea wall or levee of the present invention intended for use in areas such as Louisiana and other "Gulf Coast" regions bordering the Gulf of Mexico. In those regions, the soil subgrade 12 is relatively soft and only capable of supporting loads of less than 5 psi. The soft subgrade 12 often extends 100 feet or more in depth from the surface 10. The sea wall or levee 20 illustrated in FIGS. 1 and 2 utilizes to a maximum extent as fill material the natural and local relatively soft, sandy soils available, thereby avoiding the expense and time of otherwise removing the local materials and replacing them with rock, clay or alternate fill materials.

First and second rows of soil cement columns, 40 and 60 respectively, are formed on opposite sides of the longitudinal centerline A-A of sea wall or levee 20. Each of the individual soil-cement columns 41-49 in first row 40 and individual columns 61-69 in second row 60 are formed preferably by the GEO-JET® technique, referred to and described briefly above and in detail in the referenced patents above. This technique includes mechanical cutting of the soft subsoil and simultaneous hydraulic mixing of the mechanically cut soft subsoil with a cement slurry injected through a first nozzle at velocities of 200 feet per second or higher. By way of example, the first and second rows 40,60 may be spaced approximately 100 feet from each other and extend 80 feet below ground level 10 (FIG. 2). Each column may be 8 feet in diameter. It is significant to note that the present invention is adapted to function properly even if the soft subgrade 12 shown in FIG. 2 extends to a greater depth than the depth of the soil-cement columns. The soil-cement columns in first and second rows 40 and 60 are designed to combine the frictional effects between the subsoil and the side walls of each column together with the load bearing effect of the bottom "footprint" of each column to achieve design loads of 100 pounds psi or more of weight. In the preferred method of forming the sea wall or levee 20, the volume of each soil-cement column in rows 40 and 60 includes 15-30% by volume of cement. Bentonite may optionally be added to give flexibility to the soil cement columns. Many of the areas in the Gulf Coast region have a "crust" layer 11 that extends 8 to 15 feet below grade level 10. This layer 11 comprises fill materials and other materials that tend to have a somewhat higher load bearing capability than the soft subgrade 12.

At least some of the soil-cement columns in the first and second rows 40,60 have reinforcing structural elements shown generally as 50 embedded in them. Individual elements 50a-50e are shown in first row 40 and elements 50f-50j in second row 60. The reinforcing structural elements 50 can be H-beams made out of steel or H-beam sections formed from prestressed precast concrete in which steel strands have been prestressed as is known in the art. In the embodiment shown in FIGS. 1 and 2, the embedded reinforcing structural elements 50 are placed in every other column in first row 40 and in every other column in row 60. In this manner individual columns 41,43,45,47 and 49 and individual columns 61,63,65,67 and 69 have an embedded reinforcing element embedded in them.

As shown best in FIG. 1, at least some of the reinforcing structural elements 50a-50e in first row 40 are connected with some of the reinforcing structural elements 50f-50j in the second row 60 with tensile load bearing members referred generally as 70. In the embodiment shown, the tensile load bearing members 70 comprise individual steel cables 71,73,75,77 and 79. The tensile load bearing members 70 preferably extend perpendicularly to longitudinal axis A-A and generally perpendicularly to first and second rows of columns 40 and 60. Alternately, but less preferably, steel cable 71 could extend from the reinforcing structural element 50a carried by soil-cement column 41 to the reinforcing structural element 50g carried by soil-cement column 63. This design is less preferable because the loads being resisted by the structural elements in columns 41 and 63 are not parallel to tensile members 70.

Rather than using steel cables such as 71-79 in some situations it would be preferable to utilize beams fabricated from steel or fabricated from prestressed precast concrete. Those beams could be H-beams or T-beams.

As shown best in FIG. 2, the first row of soil-cement columns 40 and the second row of soil-cement columns 60 are designed so that the tops 40a,60a of the soil-cement columns are generally at the same level as ground level 10. The H-beams 50, as shown in FIG. 2, extend a substantial distance upwardly above ground level 10. Each of the reinforcing structural elements 50 preferably extends all the way to the bottom 40b and 60b of the rows of columns 40 and 60, as shown in phantom in FIG. 2. By way of example, the reinforcing structural elements 50 may extend 30 feet or more above ground level 10. The reinforcing cable such as 71 would be placed, by way of example, approximately 5 feet above ground level. It is also preferable to have additional tensile load bearing cables (not shown in FIG. 2) extending between structural elements 50 every 5 feet above ground level 10.

After the reinforcing structural elements are in place and the soil-cement columns have hardened, a lagging wall shown generally as 80 is formed between those portions of structural elements 50 that extend above ground level. The purpose of lagging wall 80 is to render that portion of sea wall 20 above ground level impervious to sand, and only slightly permeable to water. Lagging wall 80 may be built from heavy wooden members or other materials known in the art.

After the lagging wall 80 has been built in both the first and second rows of columns 40 and 60, fill material 90 forming a main body is deposited between the first and second rows of columns 40 and 60. These fill materials, as noted above, may include sand, silt and/or sediment. The design of the novel sea wall 20 anticipates that these fill materials 90 become essentially "fluidized" in the presence of heavy rainfall that accompanies hurricanes. The lagging walls are intended to prevent the loss of the sandy fill material 90. The fill material 90 is generally configured with a flat top 91. Roadways may be conveniently formed on the flat surface 91 of fill material 90. The fill material 90 can optionally be strengthened in selected sections by adding cement to increase its rigidity.

The resulting structure is capable of withstanding the transverse loads caused by large storm surges and is capable of lasting for extremely long periods of time, i.e., 50 to 100 years.

Figure 3:
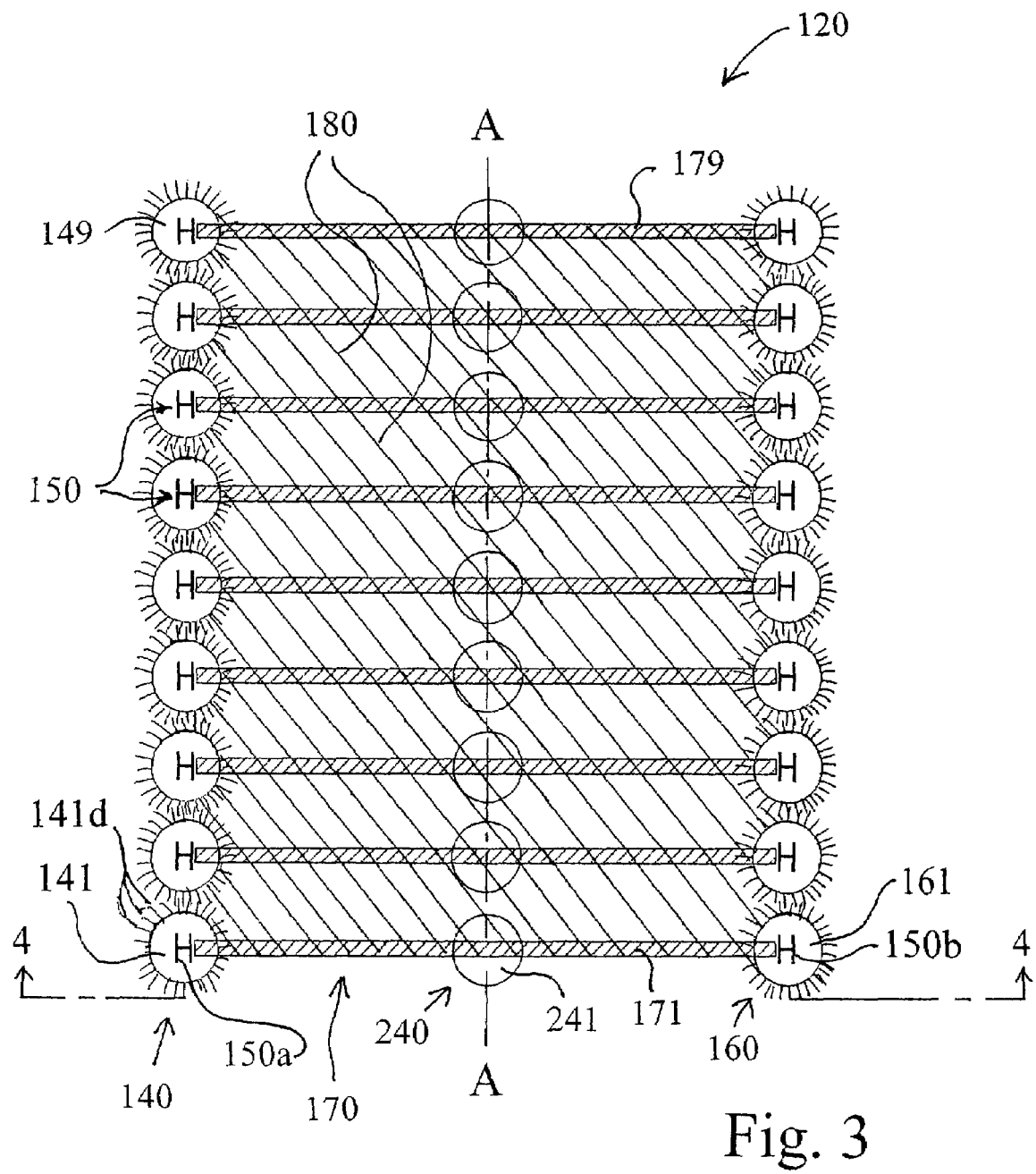
FIG. 3 is a plan view of a second embodiment of the sea wall or levee according to the present invention.
Figure 4:
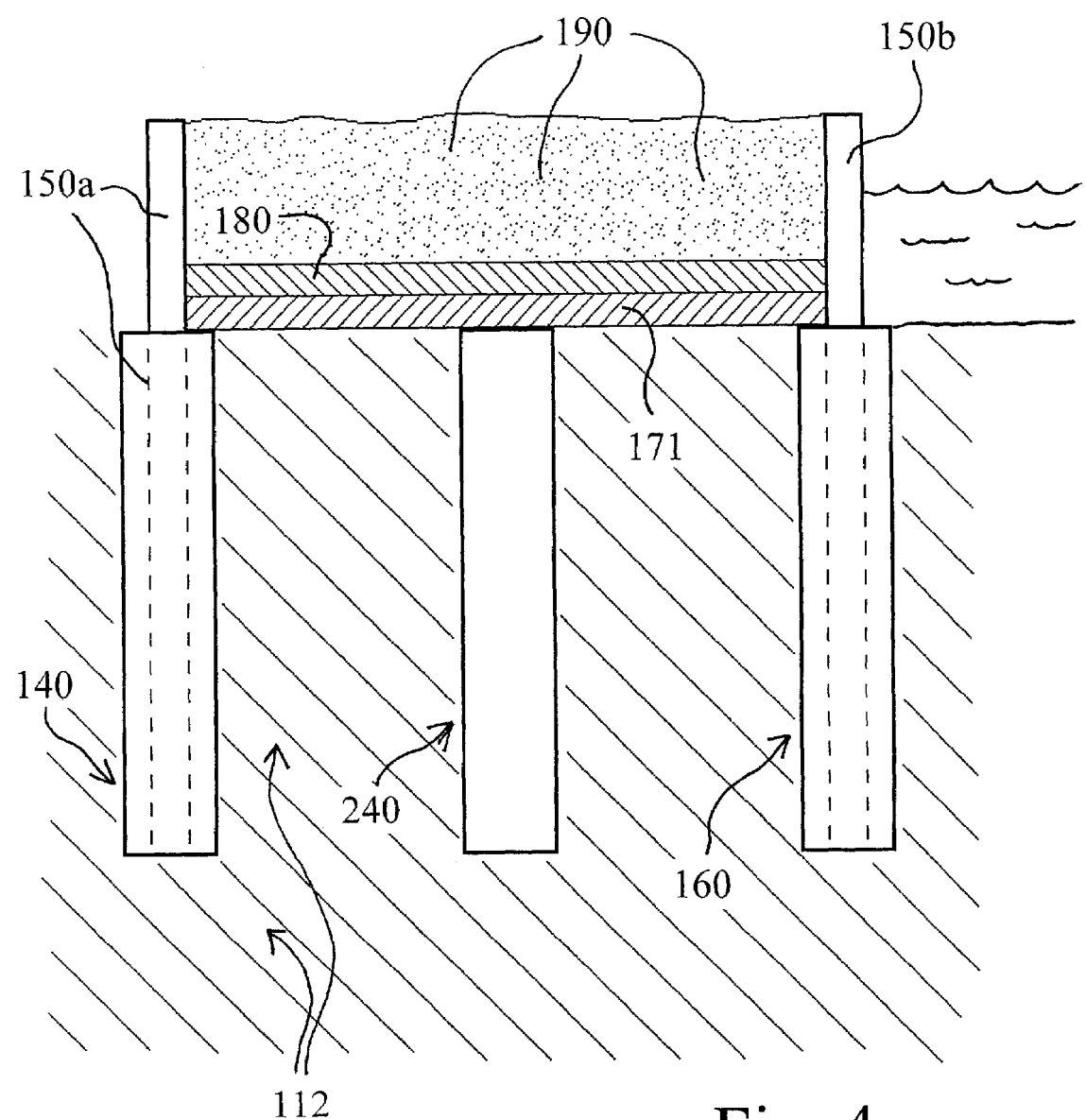
FIG. 4 is a section on the line 4-4 of FIG. 3.

FIGS. 3 and 4 illustrate a second embodiment of the invention illustrating sea wall or levee 120. Sea wall or levee 120 includes first and second rows of soil-cement columns 140 and 160 formed on opposite sides of longitudinal centerline A-A. In this embodiment, each of the individual soil-cement columns such as 141 and 149 in first row 140 has an H-beam embedded in it, as opposed to the embodiment in FIGS. 1 and 2 wherein every other column has an H-beam embedded in them. For the sake of clarity, the H-beams are not individually numbered but are referred to generally as H-beams 150. Lagging walls between adjacent H-beams are utilized, but are not shown in FIG. 3 in the interest of clarity. Each of the soil-cement columns in the first row 140 and second row 160 is placed relatively close to the adjacent column to form an "interconnected" relationship with adjacent soil-cement columns to form a curtain wall. This "interconnected" relationship is described in detail in U.S. Pat. No. 6,241,426. The inter-connection is formed by the use of a second injection nozzle placed near the outer diameter of the soil-cement column which injects cement slurry radially outwardly to penetrate the soil adjacent the main body of the soil-cement column. The interconnection is illustrated by the radial extending lines 141d extending outwardly from individual soil-cement column 141.

The sea wall or levee 120 of FIGS. 3 and 4 includes a third row of soil-cement columns 240 which extends generally along (or parallel to) the centerline A-A of sea wall or levee 120. The purpose of the third row 240 of soil-cement columns is to help bear the immense load of the sandy fill material 190, shown best in FIG. 4. All soil-cement columns in FIGS. 3 and 4 preferably include 15-30% cement, by volume.

A plurality of tensile connecting means or tension load bearing beams is shown generally as 170 and includes individual beams 171-179 which are preferably H or inverted T shaped beams. Each of the individual beams, such as beam 171, extends between a column in the first row 140 and a column in the second row 160. For example, individual beam 171 rests on top of soil cement column 141 and extends to the top of soil-cement column 161. Beam 171 is supported at its center by the top of individual soil-cement column 241 in the third row 240 of columns. Alternately, individual beam 171 can be comprised of two segments, one segment extending between soil-cement column 141 and soil-cement column 241 and a second segment extending between soil-cement column 161 and column 241. The purpose of the individual beams 171 and 179 is twofold. The first purpose is to bear the tensile loads caused by the sandy fill 190 which tends to urge soil-cement column 141 and column 161 away from centerline A-A. This is accomplished by beam 171 being rigidly attached to individual H-beam 150a embedded in soil-cement column 141 and individual H-beam 150b embedded in soil-cement column 161.

The secondary purpose of the plurality of tension load bearing members 170 is to form a sturdy platform on which a semi-permeable mat 180 is placed. Mat 180 is a non-permeable to sand but is permeable to water. As shown best in FIG. 4, the semi-permeable mat 180 is supported by beams such as individual beam 171 and bears the weight of the sandy fill material 190. The load of the sandy fill material 190 is therefore transferred by semi-permeable mat to the plurality of beams 170 and then directly to the three rows of soil-cement columns 140, 160 and 240.

The soft subsoil 112 in FIG. 4 may extend to a depth that exceeds the depths of the columns in rows 140, 160 and 240.

Figure 5:
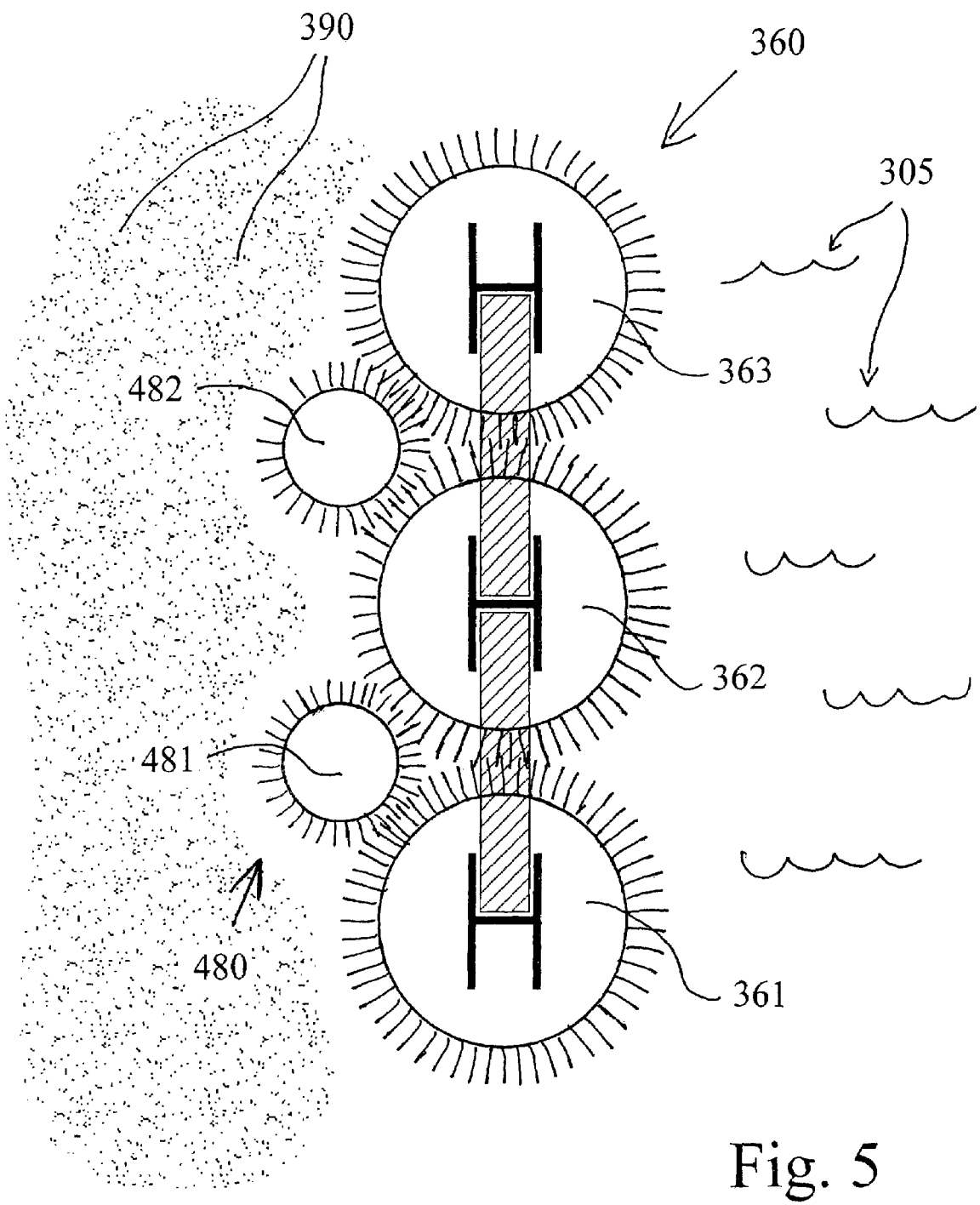
FIG. 5 is a plan view, partially in section, illustrating a portion of a third embodiment of the invention.

FIG. 5 illustrates schematically a third embodiment of the invention wherein an additional partial row of columns shown generally as 360 is illustrated adjacent a body of water 305. In this embodiment, the individual three soil-cement columns 361, 362 and 363 are inter-connected in the same fashion as the columns in rows 140 and 160 in FIG. 3. The additional interstitial row of columns 480 is illustrated which includes individual columns 481 and 482. Interstitial columns 481 and 482 are formed in the interstitial spaces between columns 361-362 and between columns 362-363, and on the side of the row of columns 360 away from the water body 305. The purpose of the additional row of interstitial columns 480 is to reinforce the row of columns 360 to prevent the sandy fill 390 from liquefying and flowing into the water body 305 between columns 361-362 or between columns 362-363.

The foregoing description of the invention has been presented for purposes of illustration and description and is not intended to be exhaustive or to limit the invention to the precise form disclosed. Modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

What is claimed is:

1. A method of building a sea wall or levee, wherein said completed sea wall or levee will have a longitudinal center line, and wherein said sea wall or levee is to be built on soft subsoil, comprising the steps:
    forming first and second rows of soil-cement columns on opposite sides of said longitudinal centerline, wherein said soil-cement columns are formed by mechanically cutting said soft subsoil and simultaneously hydraulically mixing said mechanically cut soft subsoil with a cement slurry injected through a first nozzle at velocities of 200 feet per second or higher,
    embedding reinforcing structural elements into at least some of said soil-cement columns in said first and second rows,
    connecting at least some of said reinforcing structural elements in said first row of soil-cement columns with some of said reinforcing structural elements in said second row of soil-cement columns with tensile load bearing members, and
    depositing fill materials between said first and second rows of soil-cement columns, wherein said fill materials include sand, silt and/or sediment.

2. The method of claim 1 wherein said soft subsoil is capable of bearing less than 5 pounds per square inch of weight, and wherein said soil-cement columns include 15-30% by volume of cement and are capable of bearing approximately 100 pounds per square inch or more of weight.

3. The method of claim 1 wherein each of said first and second rows of soil-cement columns forms a curtain wall of interconnected columns.

4. The method of claim 1 comprising the further step of forming an additional row of soil-cement columns, wherein said each column in said additional row is placed in an interstitial space between columns of either said first or second row of columns.

5. The method of claim 1 comprising the further step of forming a third row of soil cement columns extending along, or parallel to, said centerline.

6. The method of claim 5 comprising the further step of placing a semi-permeable mat over said tensile load bearing members.

7. A reinforced sea wall or levee, comprising:
    a main body having a longitudinal centerline,
    first and second rows of soil-cement columns formed on opposite sides of said longitudinal centerline,
    reinforcing structural members embedded in at least some of said first and second rows of soil-cement columns,
    tensile connecting means connecting at least some of said reinforcing structural members in said first row of soil-cement columns with some of said reinforcing structural members in said second row of soil-cement columns, and
    fill materials between said first and second rows of soil-cement columns, wherein said fill materials include sand, silt and/or sediment, wherein said sea wall or levee is built on subsoil capable of bearing less than 5 pounds per square inch of weight. wherein said soil-cement columns include 15-30% by volume of cement, and are capable of bearing approximately 100 pounds per square inch or more of weight.

8. The sea wall or levee of claim 7 further comprising an additional row of soil-cement columns wherein each soil-cement column in said additional row is placed in an interstitial space between columns of either first or second row of columns.

9. The sea wall or levee of claim 7 further comprising a third row of soil-cement columns formed along, or parallel to, said longitudinal centerline.

10. The sea wall or levee of claim 9 further comprising a semi-permeable mat placed on top of said tensile connecting means.

* * * * *